US009250318B2

(12) United States Patent
Izumi

(10) Patent No.: US 9,250,318 B2
(45) Date of Patent: Feb. 2, 2016

(54) ON-BOARD RADAR APPARATUS, OBJECT DETECTION METHOD, AND OBJECT DETECTION PROGRAM

(71) Applicant: Honda elesys Co., Ltd., Yokohama-shi, Kanagawa-ken (JP)

(72) Inventor: Itaru Izumi, Yokohama (JP)

(73) Assignee: HONDA ELESYS CO., LTD., Kanagawa (JP)

(*) Notice: Subject to any disclaimer, the term of this patent is extended or adjusted under 35 U.S.C. 154(b) by 302 days.

(21) Appl. No.: 13/921,794

(22) Filed: Jun. 19, 2013

(65) Prior Publication Data

US 2014/0002296 A1    Jan. 2, 2014

(30) Foreign Application Priority Data

Jun. 19, 2012    (JP) ................................. 2012-137763

(51) Int. Cl.
   *G01S 13/34*     (2006.01)
   *G01S 13/44*     (2006.01)
   *G01S 3/02*      (2006.01)
   *G01S 3/38*      (2006.01)

(52) U.S. Cl.
   CPC ............ *G01S 13/4409* (2013.01); *G01S 13/345* (2013.01); *G01S 3/023* (2013.01); *G01S 3/38* (2013.01)

(58) Field of Classification Search
   CPC ...... G01S 13/931; G01S 13/34; G01S 13/726; G01S 7/4056
   USPC ............................ 342/70, 107, 113, 133, 139
   See application file for complete search history.

(56) References Cited

U.S. PATENT DOCUMENTS

| 4,862,180 A | 8/1989 | Martin |
| 5,027,122 A | 6/1991 | Wieler |
| 5,450,089 A | 9/1995 | Hui et al. |
| 5,457,466 A | 10/1995 | Rose |
| 5,525,997 A | 6/1996 | Kwon |
| 5,633,642 A * | 5/1997 | Hoss et al. ...................... 342/70 |
| 5,729,240 A | 3/1998 | Bourgeois |
| 6,087,974 A | 7/2000 | Yu |
| 6,130,638 A | 10/2000 | Winter et al. |

(Continued)

FOREIGN PATENT DOCUMENTS

| JP | 2004-170371 A | 6/2004 |
| JP | 2010-071865 A | 4/2010 |

(Continued)

OTHER PUBLICATIONS

Office Action issued Aug. 29, 2014; U.S. Appl. No. 13/665,252.

*Primary Examiner* — Timothy A Brainard
(74) *Attorney, Agent, or Firm* — Keating & Bennett, LLP

(57) ABSTRACT

An on-board radar apparatus includes a transmission wave generating unit configured to generate a first modulated wave, a second modulated wave, and a third modulated wave which are different from each other, a transmitting antenna configured to transmit a transmission wave based on the first modulated wave, the second modulated wave, and the third modulated wave, a receiving antenna unit configured to receive a reception wave arriving by allowing the transmission wave to be reflected by an object, and an azimuth detecting unit configured to detect a signal based on the first modulated wave, the second modulated wave, and the third modulated wave from the reception, wave and to detect an azimuth of the object based on the detected signal.

16 Claims, 9 Drawing Sheets

(56) References Cited

U.S. PATENT DOCUMENTS

| | | |
|---|---|---|
| 6,225,949 B1 | 5/2001 | Guard |
| 6,356,231 B1 | 3/2002 | Zheng et al. |
| 6,549,160 B2 | 4/2003 | Meyer-Hilberg |
| 6,907,269 B2 | 6/2005 | Yamaguchi et al. |
| 6,956,521 B2 | 10/2005 | Kai |
| 7,042,386 B2 | 5/2006 | Woodford et al. |
| 7,212,152 B2 | 5/2007 | Nagasaku |
| 7,215,277 B2 | 5/2007 | Woodford et al. |
| 7,692,574 B2 | 4/2010 | Nakagawa |
| 8,049,660 B2 | 11/2011 | Mizutani et al. |
| 8,144,049 B2 | 3/2012 | Mizutani et al. |
| 8,400,350 B2 | 3/2013 | Uesato |
| 2004/0252047 A1* | 12/2004 | Miyake .................. G01S 13/34 342/107 |
| 2011/0084872 A1* | 4/2011 | Kishida ........................ 342/146 |

FOREIGN PATENT DOCUMENTS

| | | |
|---|---|---|
| JP | 2010-112937 A | 5/2010 |
| JP | 2011-163883 A | 8/2011 |

* cited by examiner

ON-BOARD RADAR APPARATUS, OBJECT DETECTION METHOD, AND OBJECT DETECTION PROGRAM

CROSS-REFERENCE TO RELATED APPLICATIONS

Priority is claimed on Japanese Patent Application No. 2012-137763 filed Jun. 19, 2012, the contents of which are entirely incorporated herein by reference.

BACKGROUND OF THE INVENTION

1. Field of the Invention

The present invention, relates to an on-hoard radar apparatus, an object detection method, and an object detection program.

2. Description of Related Art

Recently, for the purpose of improvement of convenience or safety in vehicles such as automobiles, an on-board radar apparatus using a millimeter-wave radar as a detection device has been increasingly mounted on vehicles.

Particularly, an FMCW (Frequency-Modulated Continuous Wave) system capable of simultaneously acquiring a distance and a relative velocity to a target object (object) is generally used as a detection technique in the longitudinal direction. Techniques such as detection of an azimuth of a target object using a DBF (Digital Beam Forming) method or separation of target objects using a MUSIC (Multiple Signal Classification) method are generally known as a detection technique in the transverse direction.

Here, such an on-board radar apparatus is mounted on a front part of a vehicle so as to emit radio waves (transmission waves) to the front side of the vehicle and to detect (sense) information on target objects present on tire front side of the vehicle.

Beat signals are generated by receiving reflected waves from a reflecting object (target object) by the use of an antenna array in which receiving antennas are arranged and mixing the received signals by the use of a mixer. Thereafter, frequency components relevant to the reflecting object are extracted by converting the beat signals to digital signals through the use of an A/D (Analogs-Digital) converter and processing the digital signals by an FFT (Fast Fourier Transform). The relative velocity and the distance to the target object are calculated by the combination of the frequency components extracted from an ascending section and a descending section in modulation frequency.

In the on-board radar apparatus, the azimuth of the target object is calculated by detecting an azimuth using signal processes such as a DBF or a high-resolution algorithm on the frequency components relevant to the reflecting object.

In the on-board radar apparatus, examples of the reflecting object include a vehicle, a pedestrian, and a motorcycle. When the reflecting object is a pedestrian or a motorcycle, the reflecting sectional area thereof is smaller than that of a vehicle and thus the amplitude of a reflected wave is smaller than that of a vehicle. Accordingly, when reflected waves are acquired with the same gain, the generated heat signals may be saturated or the heat signals may be buried in noise so as not to detect peak signals, whereby the on-board radar apparatus may not detect the reflecting object.

Accordingly, in Japanese Unexamined Patent Application, First Publication No. 2010-112937 A (Patent Document 1), a relative velocity and a relative distance to a reflecting object are detected by generating peak signals using different gains in first and second transmission and reception periods.

SUMMARY OF THE INVENTION

For example, an on-board radar apparatus has been proposed m which multiple sensors such as an imaging device and a radar apparatus are combined to detect a pedestrian. In this case, since the radar function is specialized for short distances, radar apparatuses for middle and long distances for detecting a vehicle other than a pedestrian are necessary and dins the cost of the apparatus increases.

In Patent Document 1, since data of reflected waves acquired using FWCM modulated waves is restricted in dynamic range, the gain of the reflected waves is lowered. Accordingly, in Patent Document 1, there is a problem in that detection of a reflecting object such as a pedestrian and a bicycle having a small reflecting sectional area and a small amplitude of a reflected wave is unstable or impossible.

In consideration of the above-mentioned circumstances, an object of the present invention is to provide an on-board radar apparatus which enables the detection of a target object having a large amplitude of a reflected wave and a target object having a small amplitude of a reflected wave, an object detection method, and an object detection program.

(1) In order to achieve the above-mentioned object, according to an aspect of the present invention, there is provided an on-board radar apparatus including: a transmission wave generating unit configured to generate a first modulated wave, a second modulated wave, and a third modulated wave which are different from each other; a transmitting antenna configured to transmit a transmission wave based on the first modulated wave, the second modulated wave, and the third modulated wave; a receiving antenna unit configured to receive a reception wave arriving by allowing the transmission wave to be reflected by an object; and an azimuth detecting unit configured to detect a signal based on the first modulated wave, the second modulated wave, and the third modulated wave from the reception wave and to detect an azimuth of the object based on the detected signal.

(2) In the on-board radar apparatus, the transmission wave may include a signal wave in which the first modulated wave, the second modulated wave, and the third modulated wave are arranged at predetermined time intervals in the order of the first modulated wave, the second modulated wave, and the third modulated wave.

(3) In the on-board radar apparatus, a modulation time of the first modulated wave may be longer than modulation times of the second and third modulated waves and the modulation time of the second modulated wave may be longer than the modulation time of the third modulated wave.

(4) In the on-board radar apparatus, the azimuth detecting unit may detect the azimuth of a first object based on a signal based on the first modulated wave and a signal based on the second modulated wave and may detect an azimuth of a second object based on the signal based on the second modulated wave and a signal based on the third modulated wave.

(5) In the on-board radar apparatus, the receiving antenna unit may include a plurality of receiving antennas that constitutes a receiving antenna array with two or more types of average pitches having no integer multiple relationship, and the on-board radar apparatus may further include a determination unit configured to perform an azimuth detecting process of detecting the azimuth of the object based on reception signals from the receiving antennas of the receiving antenna array, to determine that the detected azimuth of the object is correct when it is determined drat the azimuths of the object detected based on the reception signals from the receiving antennas of the receiving antenna array match each other, and to determine that the detected azimuth of the object is not correct when it is determined that the azimuths of the object detected based on the reception signals from the receiving antennas of the receiving antenna array do not match each other.

(6) According to another aspect of the present invention, there is provided an object detection method in an on-board radar apparatus, including: generating a first modulated wave, a second modulated wave, and a third modulated wave which are different from each other; transmitting a transmission wave based on the first modulated wave, the second modulated wave, and the third modulated wave; receiving a reception wave arriving by allowing the transmission wave to be reflected by an object; and detecting a signal based on the first modulated wave, the second modulated wave, and the third modulated wave from the reception wave and detecting an azimuth of the object based on the detected signal.

(7) According to still another aspect of the present invention, there is provided an object detection program causing a computer of an on-hoard radar apparatus to perform the processes of: generating a first modulated wave, a second modulated wave, and a third modulated wave which are different from each other; transmitting a transmission wave based on the first modulated wave, the second modulated wave, and the third modulated wave; receiving a reception wave arriving by allowing the transmission wave to be reflected by an object; and detecting a signal based on the first modulated wave, the second modulated wave, and the third modulated wave from the reception wave and detecting an azimuth of the object based on the detected signal.

According to the present invention, since first to third modulated waves different from each other are transmitted and objects are detected based on reflected waves based on the first to third modulated waves, it is possible to detect an object (for example, a vehicle) whose amplitude of a reflected wave is large and an object (for example, a pedestrian) whose amplitude of a reflected wave is small.

DETAILED DESCRIPTION OF THE INVENTION

Hereinafter, an embodiment of the present invention will be described with reference to the accompanying drawings.

Figure 1:
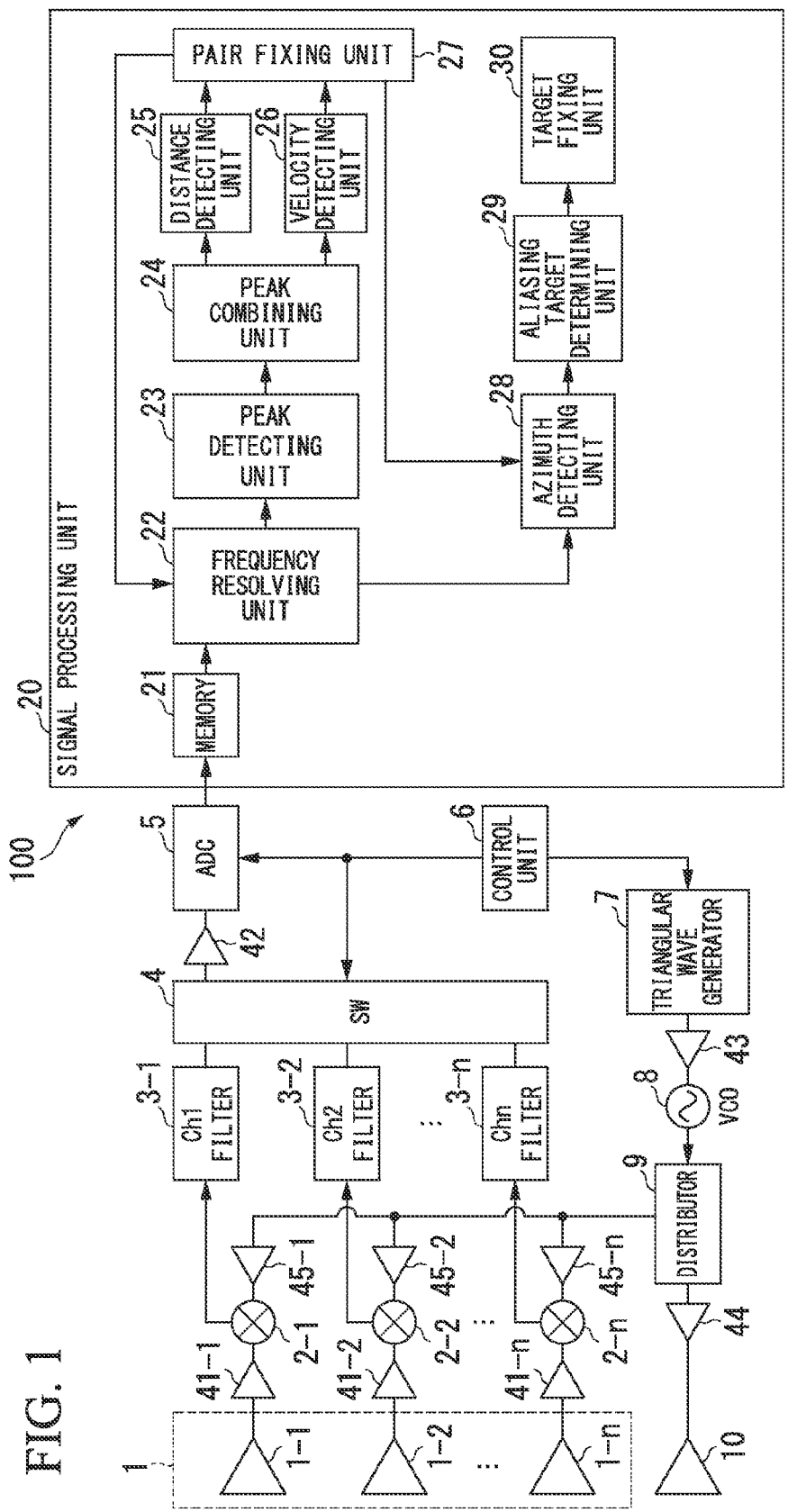
FIG. 1 is a block diagram illustrating a configuration of an on-board radar apparatus according to an embodiment of me present invention.

FIG. 1 is a block diagram illustrating a configuration of an on-board radar apparatus 100 according to an embodiment of the present invention.

In this embodiment, an electronic scanning radar apparatus (FMCW millimeter-wave radar apparatus) will be described as an example of the on-board radar apparatus 100.

The on-board radar apparatus 100 according to this embodiment can be mounted on the front side of a vehicle (for example, an automobile in this embodiment) so as to emit radio waves (transmission waves) forward from the vehicle and to detect (sense) information on an object (target) present in the front of the vehicle.

The radar apparatus 100 according to this, embodiment includes a receiving antenna unit 1 including n (where a n is an integer equal to or greater than two) receiving antennas (receiving elements) 1-1 to 1-$n$, n mixers 2-1 to 2-$n$ filters 3-1 to 3-$n$, a switch (SW) 4 an A/D converter (ADC) 5, a control unit 6, a triangular wave generator (transmission wave generator) 7, a voltage-controlled oscillator (VCO) (transmission wave generator) 8, a distributor 9, a transmitting antenna 10, and a signal processing unit (detection unit) 20.

The radar apparatus 100 according to this embodiment includes n amplifiers (amplifiers) 41-1 to 41-$n$, an amplifier 42, an amplifier (transmission wave generator) 43, an amplifier 44, and n amplifiers 45-1 to 45-$n$.

Here, the radar apparatus 100 according to this embodiment includes a receiving system of n channels (Ch) constituting a receiving antenna array. The receiving antennas 1-1 to 1-$n$, the amplifiers 41-1 to 41-$n$, the mixers 2-1 to 2-$n$, the filters 3-1 to 3-$n$, and the amplifiers 45-1 to 45-$n$ are provided for the channels, respectively.

For example, n=5 will be assumed in this embodiment.

The signal processing unit 20 includes a memory 21, a frequency resolving unit 22, a peak detecting unit 23, a peak combining unit 24, a distance detecting unit 25, a velocity detecting unit 26, a pair fixing unit 27, an azimuth detecting unit 28, an aliasing target determining unit (determination unit) 29, and a target fixing unit 30.

An example of schematic operations performed by the radar apparatus 100 according to this embodiment will be described below.

The triangular wave generator 7 generates first, second, and third triangular wave signals and outputs the generated signals to the amplifier 43 under the control of the control unit 6.

The amplifier 43 amplifies the first, second, and third triangular wave signals input from the triangular wave generator 7 and outputs the amplified signals to the VCO 8.

The VCO 8 outputs a signal including first, second, and third modulated waves, which are obtained by frequency-modulating the first, second, and third triangular wave signals based on the first, second, and third triangular wave signals input from the amplifier 43, as a transmission signal to the distributor 9.

The distributor 9 distributes the transmission signal input from the VCO 8 into two signals, outputs one distributed signal, to the amplifier 44, and outputs the other distributed signal to the amplifiers 45-1 to 45-$n$.

The amplifier 44 amplifies the signal input from the distributor 9 and outputs the amplified signal to the transmitting antenna 10.

The transmitting antenna 10 transmits the signal input from the amplifier 44 as a transmission wave in a wireless manner. The transmission wave is reflected by an object.

The receiving antennas 1-1 to 1-$n$ receive reflected waves (that is reception waves) arriving by allowing the transmission wave transmitted from, the transmitting antenna 10 to be reflected by the object and output the received reception waves to the amplifiers 41-1 to 41-$n$, respectively. The reception waves are reflected waves of the transmission wave including first, second, and third modulated waves.

The amplifiers 41-1 to 41-$n$ amplify the reception waves input from the receiving antennas 1-1 to 1-$n$ and output the amplified reception waves to the mixers 2-1 to 2-$n$, respectively.

The amplifiers 45-1 to 45-$n$ amplify the signals (the distributed signals of the transmission signal) input from the distributor 9 and output the amplified signals to the mixers 2-1 to 2-$n$, respectively.

The mixers 2-1 to 2-$n$ mix the signals of the reception waves input from the amplifiers 41-1 to 41-$n$ with the signals (the signal of the transmission wave transmitted from the transmitting antenna 10) input from the amplifiers 45-1 to 45-$n$ respectively, to generate beat signals corresponding to frequency differences therebetween, and output the generated heat signals to the filters 3-1 to 3-$n$, respectively.

The filters 3-1 to 3-$n$ band-limit the heat signals (the heat signals of channels 1 to n corresponding to the receiving antennas 1-1 to 1-$n$) input from the mixers 2-1 to 2-$n$, respectively; and output the band-limited beat signals to the switch 4.

The switch 4 sequentially switches and outputs the beat signals input from the filters 3-1 to 3-$n$ to the amplifier 42 in response to a sampling signal input from the control unit 6.

The amplifier 42 amplifies the beat signals input from the switch 4 and outputs the amplified heat signals to the A/D converter 5.

The A/D converter 5 A/D-converts the heat signals (the heat signals of channels 1 to n corresponding to the receiving antennas 1-1 to 1-$n$), which are input from the switch 4 in synchronization with the sampling signal, in response to the sampling signal input from the control unit 6 to convert analog signals into digital signals in synchronization with the sampling signal, and sequentially stores the resultant digital signals in a waveform storage area of the memory 21 of the signal processing unit 20.

The control unit 6 is constructed, for example, using a microcomputer or the like. The control unit 6 controls the overall units of the radar apparatus 100 based on a control program stored in a ROM (Read Only Memory) not shown. In a specific example, the control unit 6 controls a process of causing the triangular wave generator 7 to generate a triangular wave signal generates a predetermined sampling signal and outputs the generated sampling signal to the switch 4 and the A/D converter 5.

An example of schematic operations performed by the signal processing unit 20 will be described below.

The memory 21 stores the digital signals (heat signals) acquired by the A/D converter 5 in the waveform storage area thereof in correlation with the antennas 1-1 to 1-$n$. The digital signals are time-series data of a rising portion and a falling portion of the first, second, and third modulated waves. The first, second, and third modulated waves will be described later.

For example, when 256 values are sampled in each of the rising portion and the failing portion, 2×256×number of antennas data pieces are stored in the waveform storage area of the memory 21.

The frequency resolving unit 22 transforms the heat signals corresponding to the channels 1 to n (the receiving antennas 1-1 to 1-$n$) to frequency components with a predetermined resolution, by a frequency transform (such as a Fourier transform or DTC, a Hadamard transform, or a wavelet transform). The frequency resolving unit 22 outputs frequency points representing beat frequencies obtained as a result and complex data of the heat frequencies to the peak detecting unit 23 and the azimuth detecting unit 28.

The peak detecting unit 23 detects (senses) presence of an object for each beat frequency by detecting beat frequencies having peak values (for example, peak values of reception intensity or amplitude) of complex data pieces greater than a predetermined numerical value in each of the rising part and the failing part of the triangular waves based on the first to second modulated waves based on the information input from the frequency resolving unit 22, and selects the beat frequency corresponding to the detected object as a target frequency. The peak detecting unit 23 outputs the detection result (the beat frequency as the target frequency and the peak value thereof) of the target frequency to the peak combining unit 24.

The peak detecting unit 23 can detect the beat frequency corresponding to each peak value in the frequency spectrum as a target frequency, for example, based on a frequency spectrum transformed from complex data pieces of several receiving antennas 1-1 to 1-$n$, a frequency spectrum transformed fern the sum of complex data pieces of all the receiving antennas 1-1 to 1-$n$, or the like. When the sum of the complex data pieces of all the receiving antennas 1-1 to 1-$n$ is used, it is expected to average noise components and thus to improve an S/N (Signal-to-Noise) ratio.

The peak combining unit 24 combines the beat frequency in each of the rising portion, and the falling portion of the triangular waves based on the first and second modulated waves out of the triangular waves based on the first, second, and third modulated waves and the peak value thereof which are included in the information (the beat frequency as the target frequency and the peak value thereof) input from the peak detecting unit 23, in a matrix shape in a round-robin manner, combines all the heat frequencies in the rising portions and the falling portions, and sequentially outputs the combination results to the distance detecting unit 25 and the velocity detecting unit 26.

The peak combining unit 24 combines the heat frequency in each of the rising portion and the falling portion of the triangular waves based on the second and third modulated waves and the peak value thereof, which are included in the information input from the peak detecting unit 23, in a matrix, shape in a round-robin manner. Accordingly, the peak combining unit 24 combines all the beat frequencies in the rising portions and the falling portions and sequentially outputs the combination results to the distance detecting unit 25 and the velocity detecting unit 26.

The distance detecting unit 25 calculates a distance r to an object based on the sum of the beat frequencies (the target frequencies) in the combinations of the rising portion and the falling portion sequentially input from the peak combining unit 24, and outputs the result (which includes the peak values to this examples to the pair fixing unit 27.

The distance r is expressed by Expression (1).

$$r = \{C \cdot T/(2 \cdot \Delta f)\} \cdot \{(fu+fd)/2\} \quad (1)$$

In Expression (1), C represents the light speed, T represents the modulation time (of the rising portion or the falling portion), and Δf represents the frequency modulation width of a triangular wave. In addition, fu represents the target frequency of the rising portion of the triangular wave output from the peak combining unit 24 and fd represents the target frequency of the falling portion of the triangular wave output from the peak combining unit 24.

The velocity detecting unit 26 calculates a relative velocity v to the object based on the difference value of the heat frequencies (target frequencies) between the combinations of the rising portions and the lading portions sequentially input from the peak combining unit 24, and outputs the result (which includes the peak, values in this example) to the pair fixing unit 27.

The relative velocity v is expressed by Expression (2).

$$v=\{C/(2\cdot f0)\}\cdot\{(fu-fd)/2\} \quad (2)$$

In Expression (2), f0 represents the central frequency of a triangular wave.

The pair fixing unit 27 determines an appropriate combination of peaks in the rising portion and the falling portion corresponding to each object based on the information input from the distance detecting unit 25 and the information input from the velocity detecting unit 26, fixes a pair of peaks in each of the rising portion and the falling portion, and outputs a target group number representing the fixed pair (the distance r, the relative velocity v, and the frequency point) to the frequency resolving unit 22.

Here, since the azimuth of each target group is not determined, the position in the transverse direction parallel to the arrangement direction of the receiving antennas 1-1 to 1-$n$ with respect to the axis perpendicular to the arrangement direction of the receiving antenna array in the radar apparatus 100 according to this embodiment is not determined.

The azimuth detecting unit 28 detects (hereinafter, also referred to as "azimuth detection") the azimuth (azimuth angle) of the object based on the information input from the frequency resolving unit 22 and the information input from the pair fixing unit 27 and outputs the detected azimuth.

Here, various methods including known methods may be used as a method (for example, algorithm) used for the azimuth detecting unit 28 to detect the azimuth of an object, except for features of the radar apparatus 100 according to this embodiment in azimuth detection to be described later.

Specifically the azimuth detecting unit 28 can perform a spectrum estimating process using an AR spectrum estimating method as a high-resolution algorithm, a MUSIC method, or the like and can detect the azimuth of an object based on the spectrum estimating process result. The modified covariance method (MCOV method) is used in this embodiment.

The constituent corresponding to the azimuth detecting unit 28 employs the configuration or operation corresponding to the azimuth detecting method used in the signal processing unit 20, and may employ configurations or operations other than in this embodiment. For example, a DBF (Digital Beam Forming) method may be used as the azimuth detecting method.

For example, the known technique disclosed in Japanese Unexamined Patent Application, First Publication No. 2011-163883 can be used as the principle of detecting the distance, the relative velocity and the azimuth (azimuth angle) for an object, except for features of the radar apparatus 100 according to this embodiment in azimuth detection to be described later.

The operations performed by the frequency resolving unit 22 will be described below.

In the radar apparatus 100 according to this embodiment, a reception signal which is a reflected wave from an object is received with a delay in the time delay direction (for example, in the right direction in a graph not shown) with respect to the transmission signal in proportion to the distance between the radar apparatus 100 according to tins embodiment and the object. The reception signal varies in the frequency direction (for example, in the vertical direction in a graph not shown) with respect to the transmission signal in proportion to the relative velocity of the object to the radar apparatus 100 according to this embodiment.

At this time, when the beat signals are frequency transformed, a single peak value appears in each of the rising portion (ascending region) and the falling portion (descending region) of a triangular wave for a single object.

The frequency resolving unit 22 transforms the sampled data of the beat signals stored in the memory 21 in each of the rising portion (ascent) and the falling portion (descent) of a triangular wave at discrete times through the use of frequency decomposition (for example, Fourier transform). That is, the frequency resolving unit 22 decomposes the beat signals to the beat frequencies having a predetermined frequency bandwidth, and calculates complex data based on the heat signals decomposed for each, heat frequency.

As a result, the frequency resolving unit 22 acquires a signal level for each beat frequency to which the beat signals are frequency-decomposed in each of the rising portion and the foiling portion of a triangular wave and outputs the result to the peak detecting unit 23 and the azimuth detecting unit 28.

For example, when 256 data pieces are sampled in each of the rising portion and the falling portion of a triangular wave for each of the receiving antennas 1-1 to 1-$n$, 128 complex, data pieces (2×128×number of antennas) are obtained in each of the rising portion and the foiling portion of a triangular wave.

The complex data pieces for each of the receiving antennas 1-1 to 1-$n$ have a phase difference depending on a predetermined angle θ, and the absolute values (for example, reception intensity or amplitude) of the complex data pieces in a complex plane are equal to each other.

The predetermined angle θ will be described below.

An example where the receiving antennas 1-1 to 1-$n$ are arranged in an array shape will be considered.

A wave (incident wave, that is, a reflected wave obtained by causing an object to reflect the transmission wave transmitted from the transmitting antenna 10) arriving from an object is input on foe receiving antennas 1-1 to 1-$n$ from the direction of angle θ about the axis perpendicular to a plane on which the antennas are arranged.

At this time, the arriving wave is received at the same angle θ by the receiving antennas 1-1 to 1-$n$.

A phase difference (a value proportional to a path difference "d·sin θ") calculated using the same angle θ aid the spacing d between two neighboring receiving antennas 1-1 to 1-$n$ is caused, between the two neighboring receiving antennas 1-1 to 1-$n$.

By detecting an azimuth using the phase difference through the use of a signal process such as a DBF or a high-resolution algorithm, it is possible to detect the azimuth (angle θ) of the object.

The aliasing target determining unit 29 determines whether a peak signal is based on an object or aliasing based on the information output horn the azimuth detecting unit 28 as described later and excludes the influence of the aliasing based on the determination result. The aliasing target determining unit 29 outputs the information representing the azimuth of the object from which the influence of the aliasing is excluded to the target fixing unit 30.

The target fixing unit 30 fixes an object whose azimuth is detected by the frequency resolving unit 22 and from which the influence of the aliasing is excluded by the aliasing target determining unit 20 as a target (detected object). The target fixing unit 30 repeatedly performs a tracking process on the azimuth of the object along with other processing units (the frequency resolving unit 22, the aliasing target determining unit 29, and the like), for example, with a predetermined period as described later.

Here, the first, second, and third modulated waves will be described below.

Figure 2:
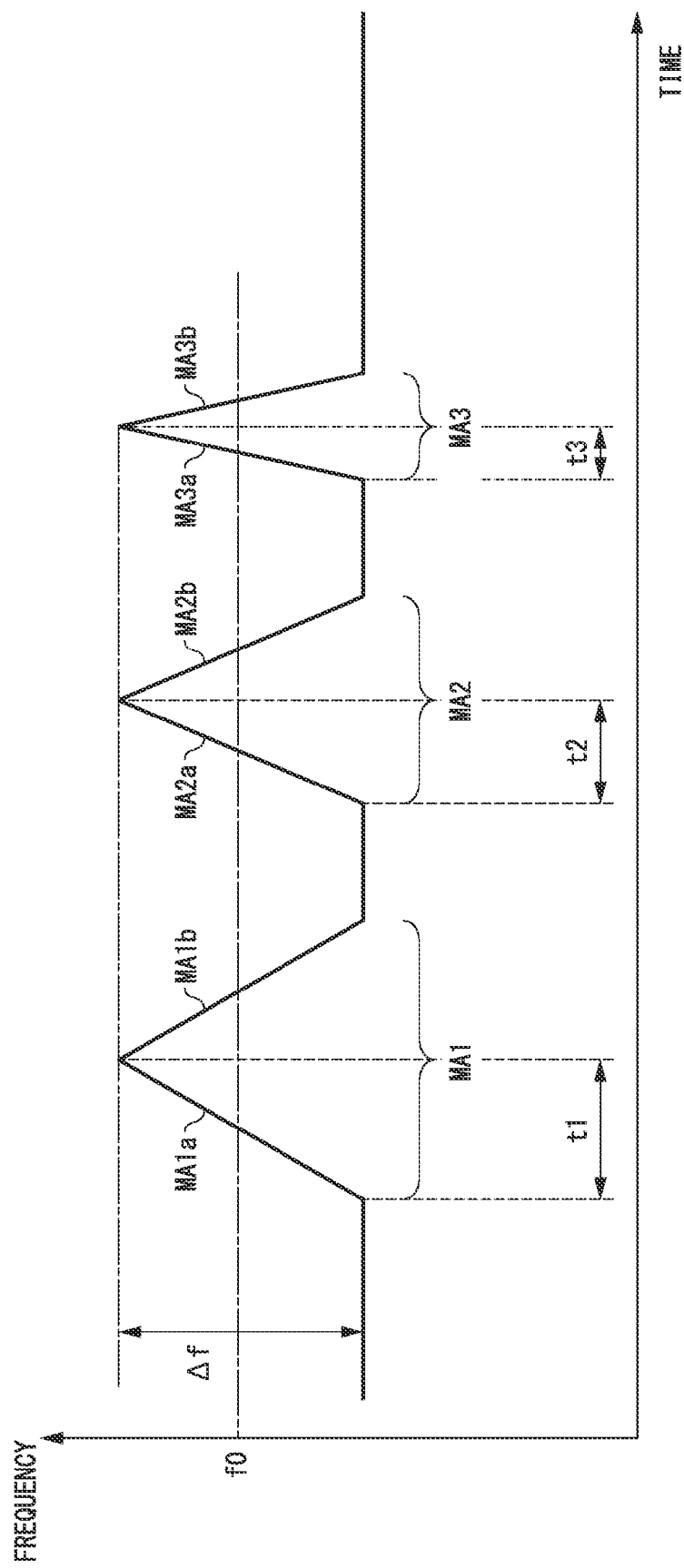
FIG. 2 is a diagram illustrating examples of first to third modulated waves according to an embodiment of the present invention.

FIG. 2 is a diagram illustrating examples of the first to third modulated waves according to an embodiment of the present invention. In FIG. 2, the horizontal axis represents the time and the vertical axis represents the frequency.

Waveform MA1 represents the first modulated wave, waveform MA2 represents the second modulated wave, and waveform MA3 represents the third modulated wave. As shown in FIG. 2, the first, second, and third modulated waves are triangular waves. Waveform MA1 has a rising portion MA1a and a falling portion MA1b, and the modulation times of the rising portion MA1a and the falling portion MA1b are t1. Waveform MA2 has a rising portion MA2a and a falling portion MA2b, and the modulation times of the rising portion MA2a and the falling portion MA2b are t2. Waveform MA3 has a rising portion MA3a and a falling portion MA3b, and the modulation times of the rising portion MA3a and the falling portion MA3b are t3. The modulation time t1 is longer than the modulation time t2 and the modulation time t3, and the modulation time t2 is longer than the modulation time t3. That is, the relationship of the modulation times is t1>t2>t3. As shown in FIG. 2, the modulation widths Δf of waveforms MA1 to MA3 are equal to each other. Here, f0 represents the central frequency of a modulated wave. In the radar apparatus 100 according to the present invention, as shown in FIG. 2, the first modulated wave, the second modulated wave, and the third modulated wave are transmitted at predetermined time intervals in this order. The predetermined time intervals may be 0, may be an even interval, or uneven intervals. It is described in this example that the first modulated wave, the second modulated wave, and the third modulated wave am transmitted in this order, hut the transmission order may be changed. However, in this case, the radar apparatus transmits the first modulated wave, the second modulated wave, and the third modulated wave at predetermined time intervals.

As described later, in the present invention, an object such as a vehicle at a long distance is detected based on the first modulated wave (MA1) and the second modulated wave (MA2). In the present invention, objects such as a pedestrian, a bicycle, and a motorcycle at short distances are detected based on the second modulated wave (MA2) and the third modulated wave (MA3).

As described above, the on-board radar apparatus according to the present invention includes the transmission wave generating unit (the triangular wave generator 7, the amplifier 43, and the VCO 8) generating the, first, second, and third modulated waves (MA1 to MA3) different horn each other, the transmitting antenna (10) transmitting a transmission wave based on the first, second, and third modulated waves different from each other, the receiving antennas (1-1 to 1-n) receiving reception waves arriving by causing an object to reflect the transmission wave, and the azimuth detecting unit (the azimuth detecting unit 28) detecting the signal based on the first, second, and third modulated waves from the reception wave and detecting the azimuth of an object based on the detected signal.

Characteristics of the first to third modulated waves will be described below.

Figure 3:
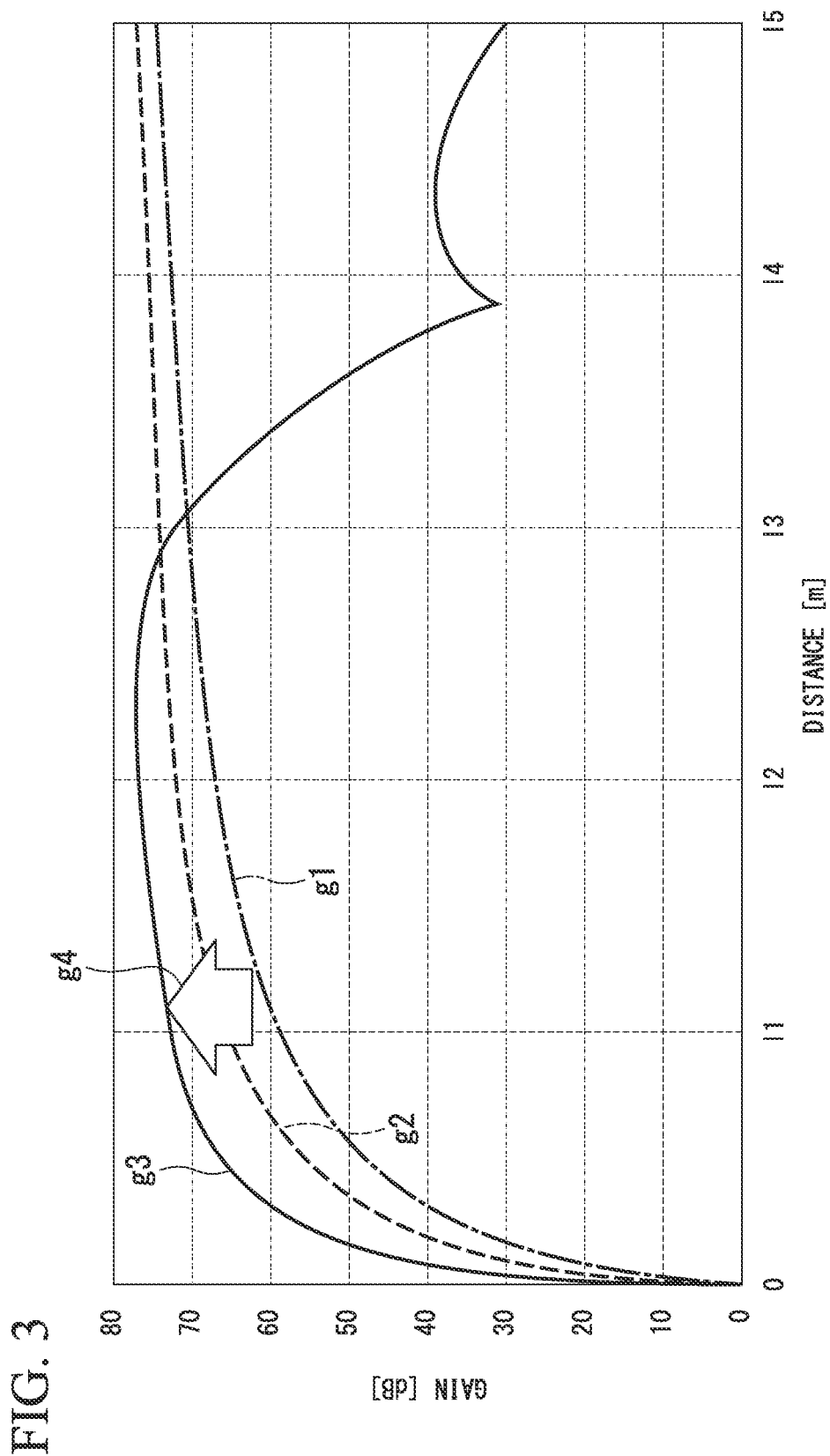
FIG. 3 is a diagram illustrating examples of frequency characteristics of beat signals whose band is limited by a filter according to an embodiment of the present invention.

FIG. 3 is a diagram illustrating examples of the frequency characteristics of the beat signals whose band is limbed by the filters 3-1 to 3-n according to an embodiment of the present invention. In FIG. 3, the horizontal axis represents the distance from the front of a vehicle nod the vertical axis represents the gain of the filter 3-n. Waveform g1 represents the gain-to-distance ratio of the first modulated wave, waveform g2 represents the gain-to-distance ratio of the second modulated wave, and waveform g3 represents the gain-to-distance ratio of the third modulated wave. Regarding the magnitude relationship of distances 11 to 15 in FIG. 3, the distance 12 is larger than the distance 11, the distance 13 is larger than the distance 12, the distance 14 is larger than the distance 13, and the distance 15 is larger than the distance 14.

As shown in FIG. 3, the gain of the first modulated wave (waveform g1) at the distance 11 is about 60 [dB]. The gain of the second modulated wave (waveform g1) at the distance 11 is about 65 [dB].

The gain, of the third modulated wave (waveform g3) at the distance 11 is about 75 [dB]. As indicated by arrow g4, the gain of the third modulated wave (waveform g3) at the distance 11 is higher by about 15 [dB] than that of the first modulated wave (waveform g1).

On the other hand, the gain of the first modulated wave (waveform g1) at the distance 14 is about 75 [dB]. The gain of the second modulated wave (waveform g2) at the distance 14 is about 80 [dB]. The gain of the third modulated wave (waveform g3) at the distance 11 is about 35 [dB], due to the characteristics of the fillers 3-1 to 3-n.

In this way, the first modulated wave has a small gain at short distances such as the distances 11 and 12, but has a large gain at long distances such as the distances 14 and 15. Accordingly, the first modulated wave can be suitably used to detect an object (first object) whose amplitude of the reflected wave is large at long distances. On the other hand, the third modulated wave has a large gain at short distances such as the distances 11 and 12, but has a small gain at long distances such as the distances 14 and 15. Accordingly, the third modulated wave can be suitably used to detect an object (second object) whose amplitude of the reflected wave is small at short distances. The second modulated wave may be used to detect an object, for example, at middle distances.

Therefore, the radar apparatus 100 according to the present invention, since a transmission wave based on the third modulated wave is included, the defection level of a signal can be relatively raised in spite of the reflected wave passing through the same paths as the first and second modulated waves different from each other. The path includes a forward traveling path of a transmission wave from the radar apparatus 100 it an object and a return path of the reflected wave from the object to the radar apparatus 100. Accordingly, it is possible to accurately detect an object having a small reflecting area and a small amplitude (level) of a reflected wave thereof at short distances using the third modulated wave.

A process flow of detecting an object according to the present invention will be described below.

Figure 4:
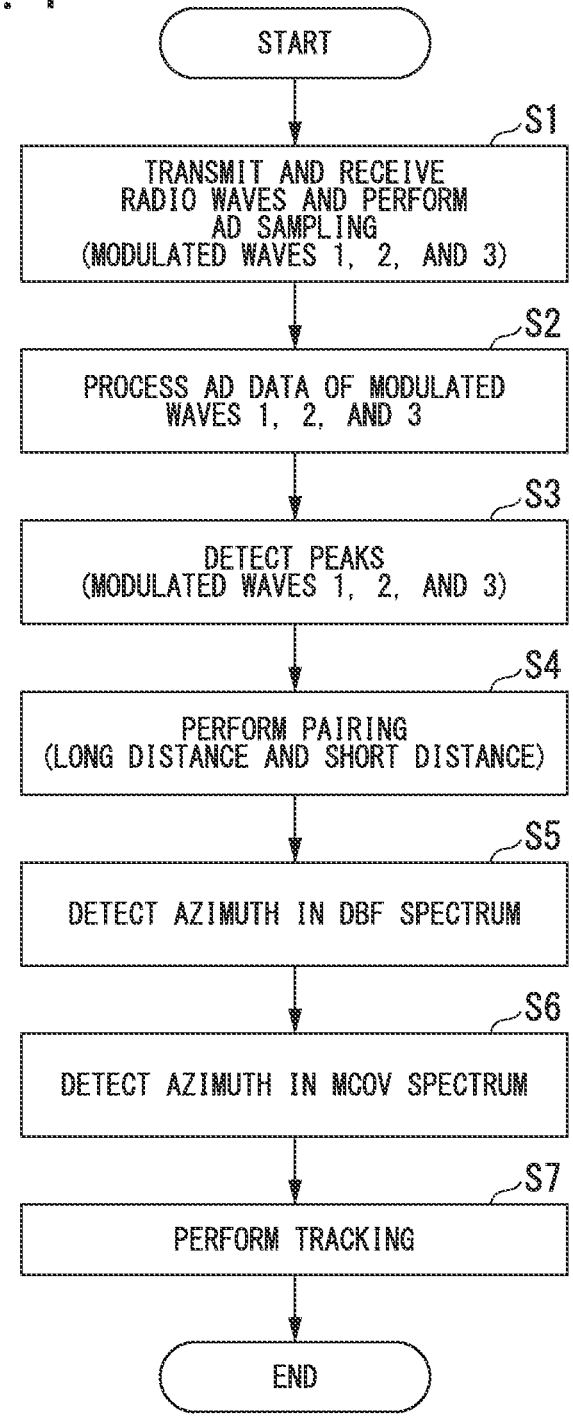
FIG. 4 is a flowchart illustrating an example of a process flow which is performed by a signal processing unit according to an embodiment of the present invention.

FIG. 4 is a flowchart illustrating an example of a process flow which is performed by the signal processing unit 20 according to an embodiment of the present invention.

(Step S1) The control unit 6 controls the triangular wave generator 7 so as to generate a signal including tire first, second, and third modulated waves. Then, the triangular wave generator 7 transmits tire generated signal as a transmission wave via the transmitting antenna 10. Subsequently, the mixers 2-1 to 2-*n* mix the reception signal based on the reception waves received via the receiving antennas 1-1 to 1-*n* and the signals based on the signal input from the distributor 9, generates the beat signals corresponding to the frequency differences therebetween, and outputs the generated heat signals to the filters 3-1 to 3-*n*. Then, the A/D converter 5 converts the beat signals as analog signals whose hand is limited by the filters 3-1 to 3-*n* into digital signals and sequentially stores the converted digital signals in the waveform storage area of the memory 21.

(Step S2) The frequency resolving unit 22 transforms the heat signals corresponding to channels 1 to n (the receiving antennas 1-1 to 1-*n*) to frequency components with a predetermined resolution by frequency-transforming the digitalized beat signals stored in the memory 21.

(Step S3) The peak detecting unit 23 detects the peaks of the frequency of the beat signals. Specifically, the peak defecting unit 23 detects beat frequencies having the peak values of complex data higher than a predetermined numerical value in the rising portions (MA1*a*, MA2*a*, and MA3*a*) and the falling portions (MA1*b*, MA2*b*, and MA3*b*) of the triangular waves (MA1 to MA3) (see FIG. 2) based on the first, second, and third modulated waves based on the information input from the frequency resolving unit 22. Through this process, the peak detecting unit 23 detects presence of an object for each beat frequency and selects the heat frequency corresponding to the detected object as a target frequency.

There the peak detecting unit 23 outputs the detection result (the beat frequencies as the target frequencies and the peak values thereof) of the target frequency to the peak combining unit 24.

(Step S4) The peak combining unit 24 pairs the beat signals. Specifically the peak combining unit 24 combines the bear frequencies in the rising portions and the falling portions in the triangular waves and the peak values thereof in a matrix shape in a round-robin manner based on the information input from the peak detecting unit 23. The peak combining unit 24 combines all the beat frequencies in the rising portions and the tailing portions through this process.

Specifically the peak combining unit 24 combines the first modulated wave and the second modulated wave for detection at long distances. The peak combining unit 24 combines the second modulated wave and the third modulated wave for detection at short distances.

(Step S5) The azimuth detecting unit 28 performs a spectrum estimating process using a DBF process based on the information input from the frequency resolving unit 22 and the information input from the pair fixing unit 27 and detects the azimuths of the peaks. The DBF process corresponds to an FFT process which is performed on the sampled data arranged in spatial directions along the arriving direction (the azimuth of the object) of the reception waves including the reflected waves from the object out of the sampled data of the heat signals acquired from the frequency resolving unit 22.

(Step S6) The azimuth detecting unit 28 performs a spectrum estimating process using an MCOV method based on the information input from the frequency resolving unit 22 and the information input from the pair fixing unit 27. Then, the aliasing target determining unit 29 determines whether the peak signals are based on an object or aliasing based on the information output from the azimuth detecting unit 28, and excludes the influence of aliasing based on the determination result. The aliasing target determining unit 29 outputs the information representing the azimuth of the object from which the influence of aliasing is excluded as described above to the target fixing unit 30. The process of step S6 will be described later.

That is, in the example shown in FIG. 4, in step S5 and step S6, the azimuth detecting unit 28 performs the azimuth detecting process using the DBF process and the azimuth detecting process using the MCOV method and specifies the azimuth of the object based on the combination of the results of the two azimuth detecting processes.

(Step S7) The target fixing unit 30 performs a tracking process on the object whose azimuth is detected in step S6.

In the example shown in FIG. 4, when the processes based on the DBF process and the spectrum estimating method are combined, a main lobe can be specified based on the peaks of a spectrum acquired using the spectrum estimating method out of the lobes acquired using the DBF process. In the example shown in FIG. 4, the lobes acquired through the DBF process can be classified info a main lobe and side lobes and thus the main lobe can be specified. Therefore, in the example shown in FIG. 4, it is possible to satisfactorily specify the azimuth of an object thanks to the merits of the MCOV method while maintaining the accuracy of the azimuth of an object which is the merit of the DBF process. Here, the DBF process of step S5 may not be performed.

The receiving antenna array according to this embodiment will be described below. In this embodiment, an uneven-spaced receiving antenna array is used as the receiving antenna array including n receiving antennas.

Figure 5:
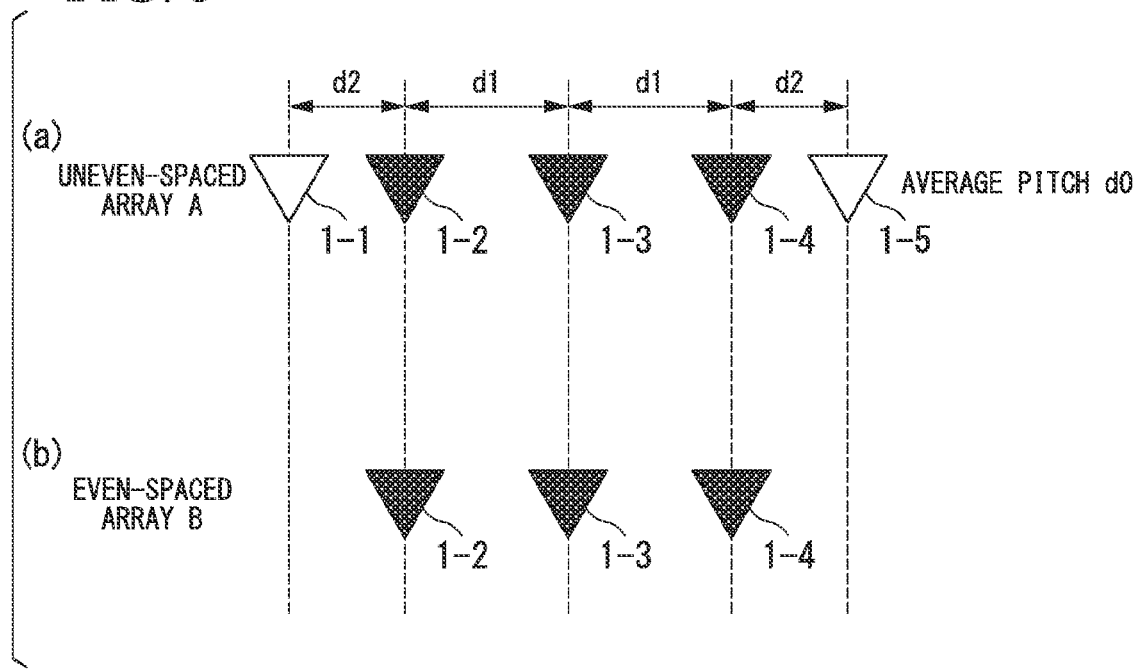
FIG. 5 is a diagram illustrating a configuration example of a receiving antenna array according to an embodiment of the present invention.

FIG. 5 is a diagram illustrating a configuration example of the receiving antenna array according to an embodiment of the present invention.

Part (a) of FIG. 5 is a block diagram illustrating the configuration of the uneven-spaced receiving antenna array according to an embodiment of the present invention. Part (b) of FIG. 5 is a block diagram illustrating a part of the receiving antennas constituting the uneven-spaced receiving antenna array according to this embodiment.

As shown in Part (a) of FIG. 5, the uneven-spaced receiving antenna array according to this embodiment has an arrangement in which n (n=5 in this embodiment) receiving antennas 1-1 to 1-5 are arranged in a line. The spacing (pitch) between the first receiving antenna 1-1 and the second receiving antenna 1-2 is d2, the spacing between the second receiving antenna 1-2 and the third receiving antenna 1-3 is d1, the spacing between the third receiving antenna 1-3 and the fourth receiving antenna 1-4 is d1, and the spacing between the fourth receiving antenna 1-4 and the fifth receiving antenna 1-5 is d2.

Here, the spacing d1 and the spacing d2 are different from each other (d1≠d2). In this embodiment, d1 is larger than d2 (d1>d2).

The spacing d1 and the spacing d2 do not have a relationship of an integer multiple (d1≠p·d2/ p=1, 2, 3 . . . ).

The average spacing (average pitch) between the neighboring receiving antennas in ail the receiving antennas 1-1 to 1-5 is defined as d0 (d0=(d2+d1+d1+d2)/4).

Here, when, the (n−1) spacings between the neighboring receiving antennas in the receiving antenna array including n receiving antennas 1-1 to 1-*n* is expressed by d(i) where i=1, 2, . . . , (n−1), the average spacing (average pitch) d0 of all the receiving antennas 1-1 to 1-*n* can be expressed by Expression (3)

$$d0 = \Sigma d(i)/(n-1) \qquad (3)$$

(where Σ takes the sum at i=1 to i=(n−1))

As shown in Part (b) of FIG. 5, apart of the receiving antennas constituting the uneven-spaced receiving antenna array according to this embodiment can be used. In this example, the second receiving antenna 1-2, the third receiving antenna 1-3, and the fourth receiving antenna 1-4 are used as three receiving antennas. In this case, the pitches between the neighboring receiving antennas have the same value d1.

Here, the use of only some receiving antennas 1-2 to 1-4 is an example and can be implemented by a configuration in which the control unit 6 or the like controls the signal processing unit 20 so as to process the signals received via the used receiving antennas 1-2 to 1-4 and controls the signal processing unit 20 so as not to process the signals received via the non-used receiving antennas 1-1 and 1-5.

In another example, the use of only some receiving antennas 1-2 to 1-4 can be implemented by a configuration in which the control unit 6 controls a switch or the like so as to turn on the connection of the used receiving antennas 1-2 to 1-4 and controls a switch or the like so as to turn off the connection of the unused receiving antennas 1-1 and 1-5.

In this embodiment, the uneven-spaced receiving antenna array using all the receiving antennas 1-1 to 1-5 is defined as "Type A" (type of a 5-channel uneven-spaced array A) as shown in Part (a) of FIG. 5, and the even-spaced receiving antenna array using some receiving antennas 1-2 to 1-4 is defined as "Type B" (type of a 3-channel even-spaced array B) as shown in Part (b) of FIG. 5.

In this embodiment, schematically, the heat signals are generated by receiving reflected waves from an object (reflecting object) using the arrangement of the receiving antennas shown in Part (a) of FIG. 5 for Part (b) of FIG. 5) and arising the reflected waves by the use of the mixers 2-1 to 2-n. The frequency components for the reflecting object are extracted by converting the heat signals into digital signals by the use of the A/D converter 5, storing the digital signals in the memory 21, and causing the frequency resolving unit 22 of the signal processing unit 20 to perform the FFT process on the digital signals. Then, the distance and the relative velocity between the radar apparatus 100 according to this embodiment and the object are calculated based on the combination of the extracted frequency components in the ascending region (rising portion) and the descending region (failing portion) of the first, second, and third modulation frequencies.

The azimuth of the object is detected by the azimuth detecting unit 28 based on the frequency components for the reflecting object extracted by the frequency resolving unit 22 of the signal processing unit 20. The aliasing target determining unit 29 determines whether the azimuth is aliasing.

In this case, in the algorithm used in the azimuth detecting unit 28 and the aliasing target determining unit 29, an object present inside an azimuth detection range is detected as an actual object therein, but an object present outside the azimuth detection range is detected at an aliasing position in the azimuth detection range.

Therefore, in this embodiment, the azimuth of an object is detected using all the channels when the uneven-spaced receiving antenna array in which the receiving antennas are arranged at different pitches d1 and d2 is used as in "type A" shown in Part (a) of FIG. 5, and the azimuth of an object is detected using some channels when the even-spaced receiving antenna array in which the receiving antennas are arranged at the same pitch d1 is used as in "type B" shown in Part (b) of FIG. 5.

Here, in the receiving antenna array, the width of the azimuth detection range is determined depending on the average spacing (average pitch) of the neighboring receiving antennas. In this embodiment, the width of the azimuth detection range varies in the receiving antenna array of "Type A" whose average pitch is d0 (the average of d1 and d2) and the receiving antenna array of "type B" whose average pitch is d1. Accordingly, in the combination of the azimuth detection result when the receiving antenna array of "Type A" is used and the azimuth detection result when the receiving antenna array of "type B" is used, both azimuth defection results match each other when an object is present inside both azimuth detection ranges (that is, in the narrower azimuth detection range), but both azimuth detection results are different from (are not matched with) each other when an object is present outside at least one azimuth detection range (that is, outside at least the narrower azimuth detection range and outside the common section of both azimuth detection ranges). The difference between both azimuth detection results depends on the difference between both azimuth detection ranges.

Such an idea is used. Specifically, when the two azimuth) detection results match each other, if is determined that the object is an object present inside the two azimuth detection ranges. When the two azimuth detection results do not match each other, it is determined that the object is an object present outside at feast one azimuth detection range. Accordingly, it is possible to determine whether the object is present inside or outside the azimuth detection range (here, the common section of the two azimuth detection ranges).

In this embodiment, when the two azimuth detection results do not match each other, it is determined that the object is an object present outside at least one azimuth detection range, the number of aliasing is assumed to be one (the number of aliasings are assumed not to be two or more times in the narrower azimuth detection range in this embodiment), the azimuth of the object can be determined based on the relationship of the two azimuth defection results. Accordingly, it is possible to substantially broaden the azimuth, detection range without charging the receiving antennas 1-1 to 1-5 of the radar apparatus 100.

In this example, the number of aliasings for an object present outside at least one azimuth detection range is assumed to be one time. Accordingly, when two or more aliasings are present for the narrower azimuth detection range, the azimuth of the object is not accurately determined.

Figure 6:
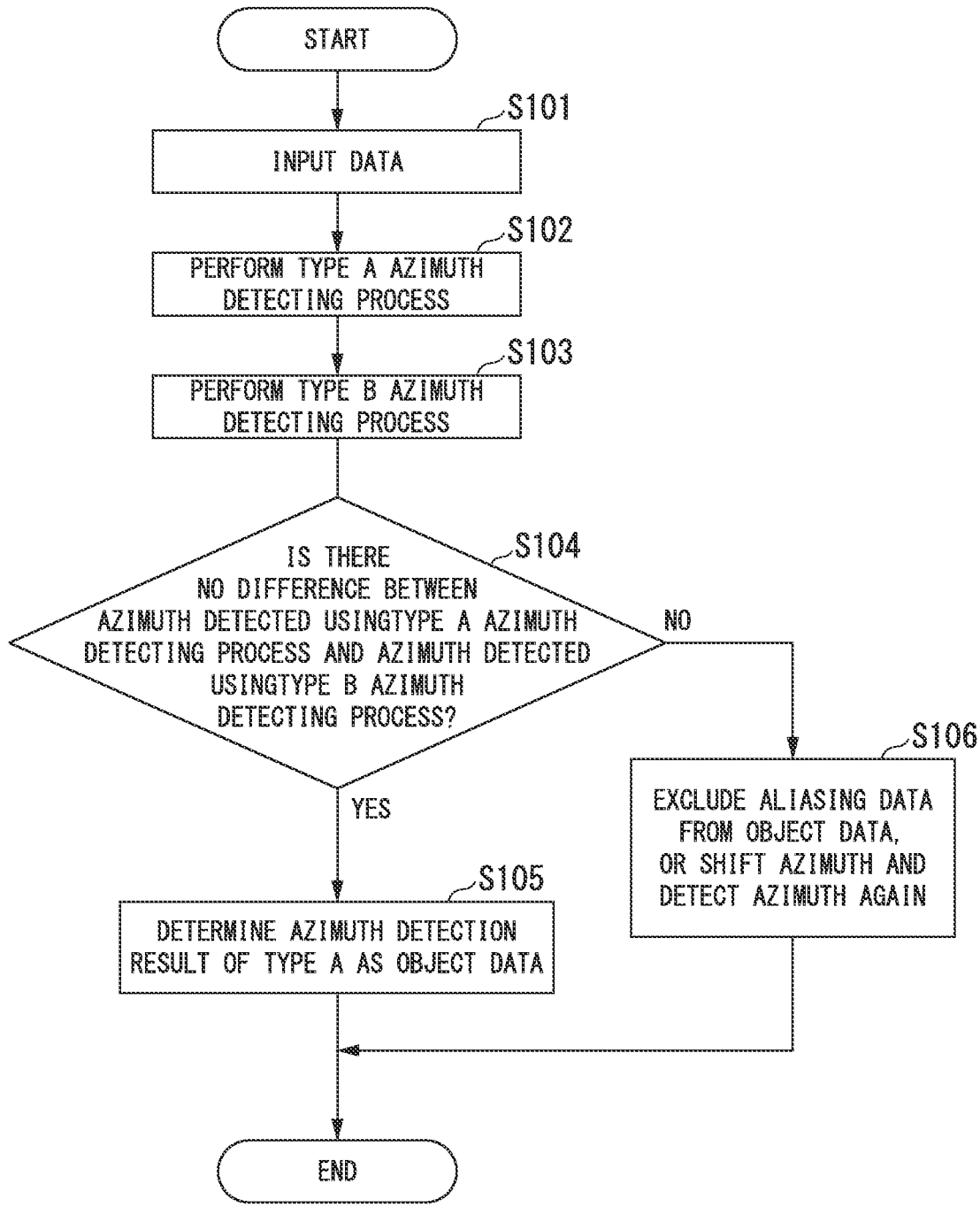
FIG. 6 is a flowchart illustrating an example of a process flow which is performed by an azimuth detecting unit 28 and an aliasing target determining unit 29 according to an embodiment of the present invention.

FIG. 6 is a flowchart illustrating an example of a process flow which is performed by the azimuth detecting unit 28 and the aliasing target determining unit 29 according to the embodiment of the present invention.

(Step S101) The azimuth detecting unit 28 receives data (data on the frequency components for a reflecting object in this embodiment) from the frequency resolving unit 22.

(Step S102) The azimuth detecting unit 28 performs an azimuth detecting process using the uneven-spaced array A which is "Type A" and detects the azimuth (the position of the azimuth angle) of an object.

(Step S103) Then, the azimuth detecting unit 28 performs an azimuth detecting process using the even-spaced array B which is "type B" and detects the azimuth (the position of the azimuth angle) of the object.

The process of step S102 and the process of step S103 may be reversely performed.

(Steps S104 to S106) The aliasing target determining unit 29 performs a process of comparing the two azimuth detection results for each object.

Specifically, the processes of steps S104 to S106 are performed as follows.

(Step S104) The aliasing target determining unit 29 determines whether there is no difference between the azimuth detection result (the position of the azimuth angle) of "type A" and the azimuth detection result (the position of the azimuth angle) of "type B".

(Step S105) When it is determined that there is no difference between the azimuth detection result (the position of the azimuth angle) of "type A" and the azimuth detection result (the position of the azimuth angle) of "type B" the aliasing target determining unit 29 considers that the object is an object (actual object) present inside the azimuth detection range (here, the common section of the two azimuth detection ranges) and sets, for example, the azimuth detection result (azimuth angle position) of "type A" as azimuth data of the object.

In this case, the azimuth detection result (the position of the azimuth angle) of "type B" instead of the azimuth detection result (the position of the azimuth angle) of "type A" may be set as the azimuth data of the object.

(Step S6) On the other band, when it is determined that there is a difference between the azimuth detection result (the position of the azimuth angle) of "type A" and the azimuth detection result (the position of the azimuth angle) of "type B", the aliasing target determining unit 29 considers that the object present outside the azimuth detection range (here, the common section of the two azimuth detection ranges) is detected at an aliasing position inside the azimuth detection range (here, the common section of the two azimuth detection ranges) and excludes the azimuth detection results from the data of the object.

Here, as the technique of determining whether there is a difference between the azimuth detection result (the position of the azimuth angle) of "type A" and the azimuth detection result (the position of the azimuth angle) of "type B" for example, a technique of determining that there is a difference when the values of the two azimuth detection results (the values representing the positions of the azimuth angles) are not equal to each other (that is, different horn each other) and determining that there is no difference when the values of the two azimuth detection results are equal to each other.

In another example, a technique of determining that there is a difference when an error is allowed more or less in the values of the two azimuth detection results and the difference between the values of the two azimuth defection results is equal to or more than a predetermined threshold value and determining that there is no difference when the difference between the values of the two azimuth detection results is less than the threshold value may be used.

In this way, in the flowchart shown in FIG. 6, the azimuth detecting unit 28 performs an azimuth detecting process of "type A" on the frequency components for a reflecting object to calculate azimuth information of the object and performs an azimuth detecting process of "type B" to calculate azimuth information of the object. After calculating the azimuth information of the object in two types A and B, the aliasing target determining unit 29 compares the azimuth information of the object acquired in the two types for each object. When the azimuth information of the object acquired in the two types agrees (where an error may be allowed) for each object, the aliasing target determining unit 29 determines that the object is an object present inside the azimuth detection range (here, the common section of the two azimuth detection ranges) and sets the data thereof.

In the flowchart shown in FIG. 6, when the azimuth information of the object acquired in the two types does not agree (where an error may be allowed), the aliasing target determining unit 29 determines that the object is an object present outside the azimuth detection range (here, the common section of the two azimuth detection ranges) and excludes the determination result from the data of the object without storing the determination result in a status memory or the like. However, in another example, when the azimuth information of the object acquired in the two types does not agree (where an error may be allowed), it may be determined that the object is an object present outside the azimuth detection range (here, the common section of the two azimuth detection ranges) and the determination result may be stored in a status memory or the like.

It is described above in this embodiment that the aliasing target determining unit 29 is provided, but the azimuth detecting unit 28 may have the function of the aliasing target determining unit 29.

Figure 7:
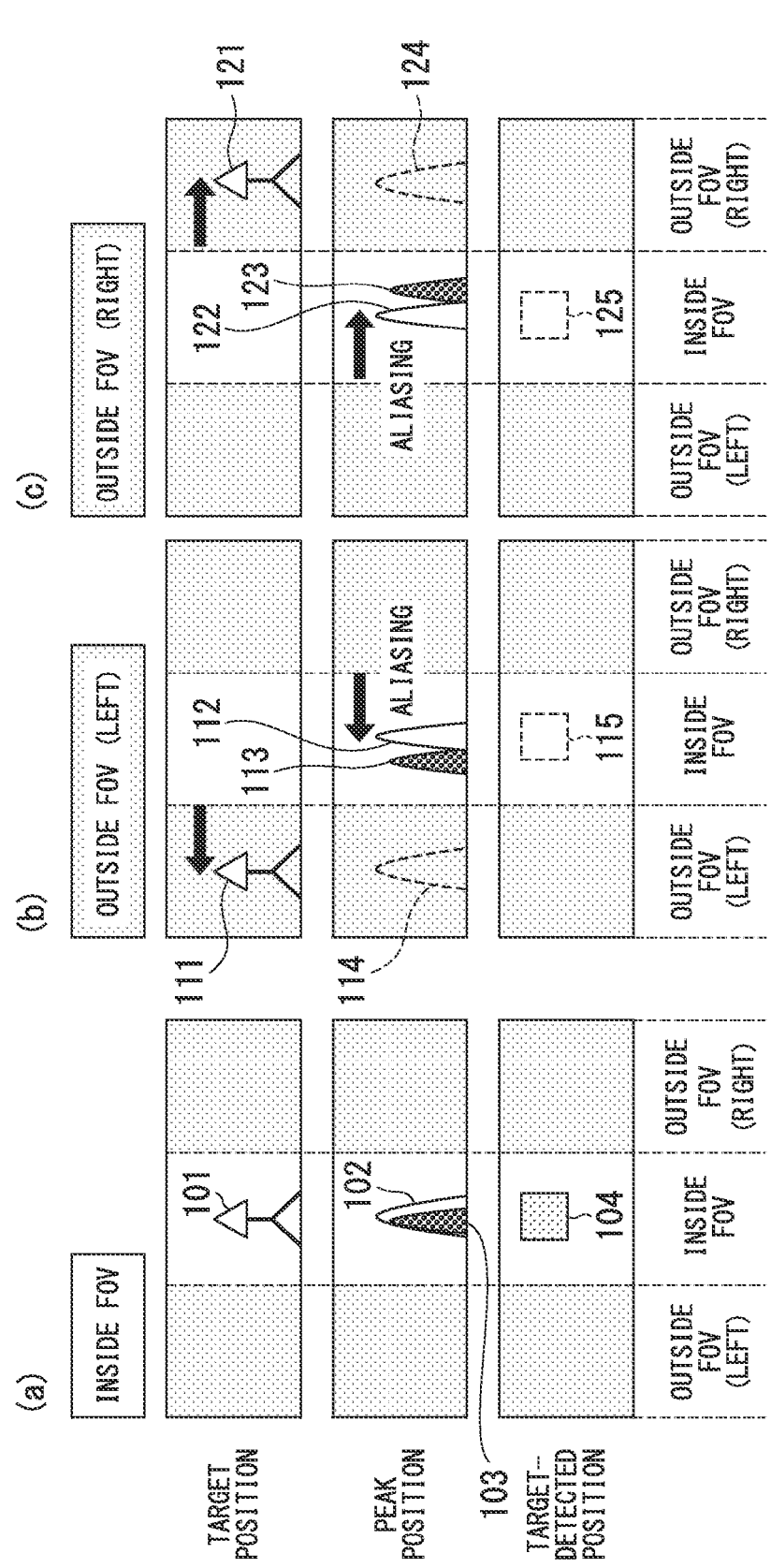
FIG. 7 is a diagram illustrating aliasing in an uneven-spaced array according to an embodiment of the present invention.

An aliasing target determining process which is performed by the aliasing target determining unit 29 will be described with reference to FIGS. 7 to 9. FIG. 7 is a diagram illustrating abasing in an uneven-spaced array according to an embodiment of the present invention. Part (a) of FIG. 7 is a diagram illustrating an example where an object is present inside an azimuth detection range (FOV). Part (b) of FIG. 7 is a diagram illustrating an example where an object is present outside (on the left side of) the azimuth detection range (FOV). Part (c) of FIG. 7 is a diagram illustrating an example where an object is present outside (on the right side of) the azimuth detection range (FOV).

The azimuth detection range (FOV) shown in Part (a) of FIG. 7, Part (b) of FIG. 7, and Part (c) of FIG. 7 represents the narrower azimuth detection range (FOV) of the azimuth detection range of "type A" and the azimuth detection range of "type B". In this example, it is assumed that the azimuth detection range of "type B" is narrower than the azimuth detection range of "type A".

The outside (left) of the azimuth detection range (FOV) means an aliasing region departing horn the inside of the azimuth detection range (FOV) in one direction of the minus direction and the plus direction in the azimuth of the object. The outside (right) of the azimuth detection range (FOV) means an aliasing region departing from the inside of the azimuth detection range (FOV) in the other direction of the minus direction and the plus direction in the azimuth of the object.

In the example shown in Part (a) of FIG. 7, an object (target) 101 is present inside the azimuth detection range (FOV). In this case, the peak position of a spectrum (a spectrum 102 in this example) indicating the azimuth (azimuth angle) acquired as the result of the azimuth detection using "type A" and the peak position of a spectrum (a spectrum 103 in this example) indicating the azimuth (azimuth angle) acquired as the result of the azimuth detection using "type B" match each other. Accordingly, the aliasing target determining unit 29 detects the position (target-detected position) 104 of the azimuth angle corresponding to the agreed peak position as the azimuth of the object 101.

In the example shown in Part (b) of FIG. 7, an object (target) 111 is present outside (on the left side of) the azimuth detection range (FOV). In this case, the peak position of a spectrum (a spectrum 112 in this example) indicating the azimuth (azimuth angle) acquired as the result of the azimuth detection using "type A" and the peak position of a spectrum (a spectrum 113 in this example) indicating the azimuth (azimuth angle) acquired as the result of the azimuth detection using "type B" are mismatched and do not match each other. In this example, the peak position of the spectrum 113 is located on the left side of the peak position of the spectrum 112.

Here, the peak position of the spectrum 114 corresponds to the actual azimuth (azimuth when it is assumed that there is no aliasing) of the object 111, but the vicinity of the target-detected position 115 as one aliasing position, is detected as the azimuth, of the object 111 in the azimuth detecting process.

Here, the aliasing target determining unit 29 determines that the position is an aliasing position in the left direction with reference to the relationship between the peak positions of the two spectrums 112 and 113. The aliasing target determining unit 29 considers that the position is one aliasing position and can determine the actual azimuth of the object 111 based on the result of the azimuth detecting process (for example, the relationship between the peak positions of the two spectrums 112 and 113) in consideration of the aliasing. Accordingly, according to this embodiment, it is possible to achieve the same advantages as substantially broadening the azimuth detection range (FOV).

In the example shown in Part (c) of FIG. 7, an object (target) 121 is present outside (on the right side oft the azimuth detection range (FOV). In this case, the peak position of a spectrum (a spectrum 122 in this example) indicating the azimuth (azimuth angle) acquired as the result of the azimuth detection using "type A" and the peak position of a spectrum (a spectrum 123 in this example) indicating the azimuth (azimuth angle) acquired as the result of the azimuth detection using "type B" are mismatched and do not match each other. In this example, the peak position of the spectrum 123 is located on the right side of the peak position of the spectrum 122.

Here, the peak position of the spectrum 124 corresponds to the actual azimuth (azimuth when it is assumed that there is no aliasing) of the object 121, but the vicinity of the target-detected position 125 as one aliasing position is detected as the azimuth of the object 121 in the azimuth detecting process.

Here, the aliasing target determining unit 29 determines that the position is an aliasing position in the right direction with reference to the relationship between the peak positions of the two spectrums 122 and 123. The aliasing target determining unit 29 considers that the position is one aliasing position and can determine the actual azimuth of the object 121 based on the result of the azimuth detecting process (for example, the relationship between the peak positions of the two spectrums 122 and 123) in consideration of the aliasing. Accordingly, according to this embodiment, it is possible to achieve the same advantages as substantially broadening the azimuth detection range (FOV).

Figure 8:
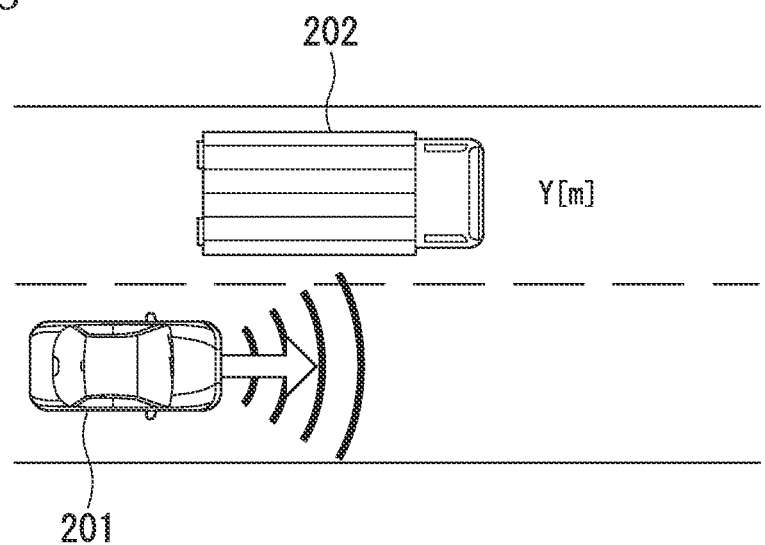
FIG. 8 is a diagram illustrating a relationship between a host vehicle and a different vehicle in simulation.
Figure 9:
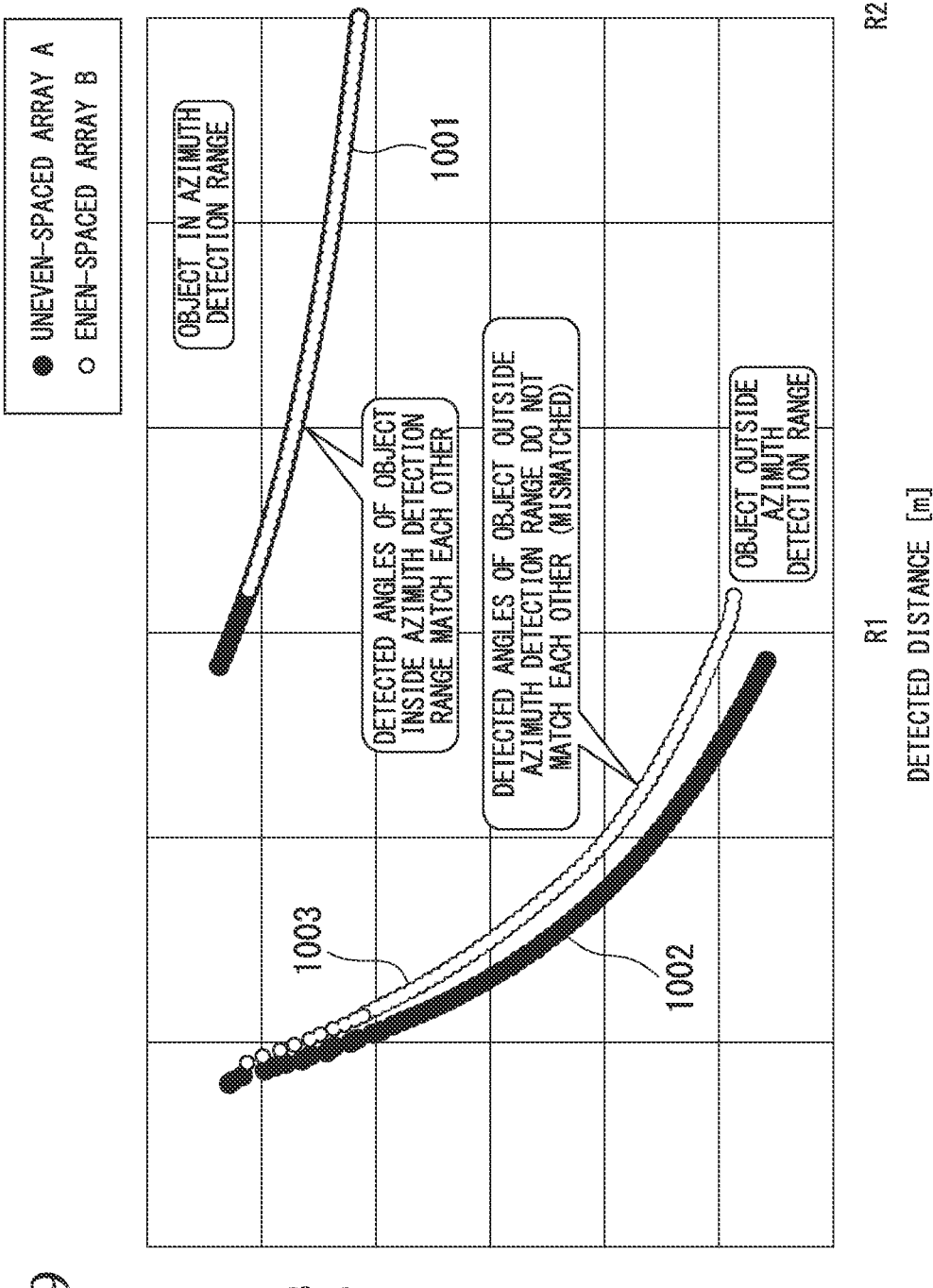
FIG. 9 is a diagram illustrating the result of simulation of a radar apparatus according to an embodiment mounted on a specific vehicle.

FIGS. 8 and 9 show simulation results of the radar apparatus 100 according to this embodiment. FIG. 8 is a diagram illustrating a relationship between a host vehicle 201 and a different vehicle 202 in the simulation. In this example, the different vehicle 202 as an object is present on the left side Y[m] (where Y is a value larger than 0) about the axis of the forward direction (traveling direction) of the host vehicle 201 having the radar apparatus 100 according to this embodiment mounted thereon.

Simulation conditions will be described below.

In the simulation conditions, the number of receiving antennas (the number of receiving elements) N (where N is, for example, an integer equal to or more than 3), the central pitch d1 (see FIG. 5) of the receiving antenna array is d0-α (where α is, for example, a value lamer than 0), the pitch d2 (see FIG. 5) at both ends of the receiving antenna array is d0-α, and the combined pitch (average pitch) of the receiving antenna array is d0.

FIG. 9 is a diagram illustrating a simulation result of the radar apparatus 100 according to this embodiment mounted on the host vehicle 201. In FIG. 9, the horizontal axis represents the distance (detected distance [m]) to an object (the different vehicle 202) detected by the radar apparatus 100 according to this embodiment and the vertical axis presents the azimuth angle (azimuth-detected angle [deg]) of the object (the different vehicle 202) detected by the radar apparatus 100 according to this embodiment.

A case where the distance between the host vehicle 201 and the different vehicle 202 in FIG. 8 becomes smaller is reflected in the graph shown in FIG. 9.

In the graph shown in FIG. 9, when the distance between the host vehicle 201 and the different vehicle 202 ranges from the vicinity of R2[m] (where R2 is a value larger than 0) to the vicinity of R1[m] (where R1 is a value larger than 0 and smaller than R2), the object (the different vehicle 202) is present inside the azimuth detection range (here, the common section, of the two azimuth detection ranges), and the azimuth detection result using the uneven-spaced array A of "Type A" and the azimuth detection result using the even-spaced array B of "Type B" match each other. The agreed azimuth detection result is marked by a curve 1001. Accordingly, the azimuth angle of the actual object is detected.

On the older hand, when the distance between the host vehicle 201 and the different vehicle 202 is less than the vicinity of R1[m], the object (the different vehicle 202) departs from the azimuth detection range (here, the common section of the two azimuth, detection ranges), and the azimuth detection result (marked by a curve 1002) using the uneven-spaced array A of "type A" and the azimuth detection result (marked by a curve 1003) using the even-spaced array B of "type B" do not match each other and are mismatched. In this case, an aliasing azimuth angle is detected.

As described above, in the on-board radar apparatus 100 according to this embodiment, a transmission wave based on the first, second, and third modulated waves different from each other is transmitted and an object is detected based on reception waves which are the reflected waves based on the first, second, and third modulated waves. That is, in this embodiment, an object at long distances is detected based on the first and second modulated waves, and an object at short distances is detected based on the second and third modulated waves. As a result, for example, even a pedestrian having a small reflecting area can be detected using the third modulated wave having a large gain in the received signals.

In the on-board radar apparatus 100 according to this embodiment, the azimuth of an object is detected in each arrangement of the antennas having two types of average spacing (average pitches) d0 and d1 using the uneven-spaced receiving antenna array in which multiple receiving antennas 1-1 to 1-n are arranged at different spacing d1 and d2, it is determined whether two azimuth detection results match each other, and it is determined whether an object is present inside or outside the azimuth detection range based on the determination result. Therefore, in the on-board radar apparatus 100 according to this embodiment when an aliasing position of an object which is present outside (on the left or right side of) the azimuth defection range is detected, it is possible to determine the aliasing position and to detect the azimuth of an object, for example, by excluding the information of the aliasing position from the data of the object or considering that the position is one aliasing position.

As a result, in the on-board radar apparatus 100 according to this embodiment, it is possible to appropriately detect any object even when an object is a vehicle present at long distances and having a large amplitude of the reflected wave thereof and even when an object is a pedestrian present at short distances and having a small amplitude of the reflected wave thereof.

The present embodiment of the invention has been described in detail with reference to the accompanying drawings, but a specific configuration is not limited to the embodiment, and design modification or the like in a range without departing from the outline of the invention may be made.

Furthermore, a program for realizing the functions (for example, functions, of one or more processing units among the azimuth detecting unit 28 or the other processing units 22 to 30 in the signal processing unit 20) of the radar apparatus 100 according to the above-described embodiment may be recorded in a computer-readable recording medium, and a computer system may read the program recorded in the recording medium to execute the program, to thereby perform the processes. Here, the "computer system" may include hardware such as an OS (operating system) or peripherals.

Furthermore, the "computer-readable recording medium" refers to a storage device such as a writable non-volatile memory such as a flexible disk, a magneto-optical disc, a ROM (Read Only Memory) or a flash memory, a movable medium such as a DVD (Digital Versatile Disk), or a hard disk bulk in the compote system.

Furthermore, the "computer-readable recording medium" may include a medium that stores a program for a predetermined time, such as a volatile memory (for example, DRAM (Dynamic Random Access Memory)) in a computer system that is a server or a client when the program is transmitted through a network such as the internet or a communication line such as a telephone line.

Furthermore, the program may be transmitted iron a computer system that stores the program in a storage device or the like to a different computer system through a transmission medium or using transmission waves in the transmission medium. Here, the "transmission medium" that transmits the program refers to a medium having a function of transmitting information, such as a network (communication network) such as the internet or a communication line (communication cable) such as a telephone line.

Furthermore, the program, may be a program for realizing a part of the above-mentioned functions. Furthermore, the program may be a so-called difference file (difference program) that is capable of implementing the above-described function by combination with a program that is stored in advance in the computer system.

What is claimed is:

1. An on-board radar apparatus comprising:
   a transmission wave generating unit configured to generate a first modulated wave, a second modulated wave, and a third modulated wave which are different from each other;
   a transmitting antenna configured to transmit a transmission wave based on the first modulated wave, the second modulated wave, and the third modulated wave;
   a receiving antenna unit configured to receive a reception wave arriving by allowing the transmission wave to be reflected by an object; and
   an azimuth detecting unit configured to detect a signal based on the first modulated wave, the second modulated wave, and the third modulated wave from the reception wave and to detect an azimuth of the object based on the detected signal; wherein
   the azimuth detecting unit detects the azimuth of a first object based on a signal based on the first modulated wave and a signal based on the second modulated wave and detects an azimuth of a second object based on the signal based on the second modulated wave and a signal based on the third modulated wave.

2. The on-board radar apparatus according to claim 1, wherein the transmission wave includes a signal wave in which the first modulated wave, the second modulated wave, and the third modulated wave are arranged at predetermined time intervals in the order of the first modulated wave, the second modulated wave, and the third modulated wave.

3. The on-board radar apparatus according to claim 2, wherein a modulation time of the first modulated wave is longer than modulation times of the second and third modulated waves and the modulation time of the second modulated wave is longer than the modulation time of the third modulated wave.

4. The on-board radar apparatus according to claim 3, wherein the receiving antenna unit includes a plurality of receiving antennas that constitutes a receiving antenna array with two or more types of average pitches having no integer multiple relationship, and
   wherein the on-board radar apparatus further comprises a determination unit configured to perform an azimuth detecting process of detecting the azimuth of the object based on reception signals from the receiving antennas of the receiving antenna array, to determine that the detected azimuth of the object is correct when it is determined that the azimuths of the object detected based on the reception signals from the receiving antennas of the receiving antenna array match each other, and to determine that the detected azimuth of the object is not correct when it is determined that the azimuths of the object detected based on the reception signals from the receiving antennas of the receiving antenna array do not match each other.

5. The on-board radar apparatus according to claim 2, wherein the receiving antenna unit includes a plurality of receiving antennas that constitutes a receiving antenna array with two or more types of average pitches having no integer multiple relationship, and
   wherein the on-board radar apparatus further comprises a determination unit configured to perform an azimuth detecting process of detecting the azimuth of the object based on reception signals from the receiving antennas of the receiving antenna array, to determine that the detected azimuth of the object is correct when it is determined that the azimuths of the object detected based on the reception signals from the receiving antennas of the receiving antenna array match each other, and to determine that the detected azimuth of the object is not correct when it is determined that the azimuths of the object detected based on the reception signals from the receiving antennas of the receiving antenna array do not match each other.

6. The on-board radar apparatus according to claim 1, wherein a modulation time of the first modulated wave is longer than modulation times of the second and third modulated waves and the modulation time of the second modulated wave is longer than the modulation time of the third modulated wave.

7. The on-board radar apparatus according to claim 6, wherein the receiving antenna unit includes a plurality of receiving antennas that constitutes a receiving antenna array with two or more types of average pitches having no integer multiple relationship, and
   wherein the on-board radar apparatus further comprises a determination unit configured to perform an azimuth detecting process of detecting the azimuth of the object based on reception signals from the receiving antennas of the receiving antenna array, to determine that the detected azimuth of the object is correct when it is determined that the azimuths of the object detected based on the reception signals from the receiving antennas of the receiving antenna array match each other, and to determine that the detected azimuth of the object is not correct when it is determined that the azimuths of the object detected based on the reception signals from the receiving antennas of the receiving antenna array do not match each other.

8. The on-board radar apparatus according to claim 1, wherein the receiving antenna unit includes a plurality of receiving antennas that constitutes a receiving antenna array with two or more types of average pitches having no integer multiple relationship, and wherein the on-board radar apparatus further comprises a determination unit configured to perform an azimuth detecting process of detecting the azimuth of the object based on reception signals from the receiving antennas of the receiving antenna array, to determine that the detected azimuth of the object is correct when it is determined that the azimuths of the object detected based on the reception signals from the receiving antennas of the receiving antenna array match each other, and to determine that the detected azimuth of the object is not correct when it is determined that the azimuths of the object detected based on the reception signals from the receiving antennas of the receiving antenna array do not match each other.

9. An object detection method in an on-board radar apparatus, comprising:

generating a first modulated wave, a second modulated wave, and a third modulated wave which are different from each other;

transmitting a transmission wave based on the first modulated wave, the second modulated wave, and the third modulated wave;

receiving a reception wave arriving by allowing the transmission wave to be reflected by an object; and detecting a signal based on the first modulated wave, the second modulated wave, and the third modulated wave from the reception wave and detecting an azimuth of a first object based on a signal based on the first modulated wave and a signal based on the second modulated wave and detects an azimuth of a second object based on the signal based on the second modulated wave and a signal based on the third modulated wave.

10. The object detection method in the on-board radar apparatus according to claim 9, wherein the transmission wave includes a signal wave in which the first modulated wave, the second modulated wave, and the third modulated wave are arranged at predetermined time intervals in the order of the first modulated wave, the second modulated wave, and the third modulated wave.

11. The object detection method in the on-board radar apparatus according to claim 9, wherein a modulation time of the first modulated wave is longer than modulation times of the second and third modulated waves and the modulation time of the second modulated wave is longer than the modulation time of the third modulated wave.

12. The object detection method in the on-board radar apparatus according to claim 9, wherein the on-board radar apparatus includes a receiving antenna unit including a plurality of receiving antennas that constitutes a receiving antenna array with two or more types of average pitches having no integer multiple relationship;

detecting the azimuth of the object based on reception signals from the receiving antennas of the receiving antenna array;

determining that the detected azimuth of the object is correct when it is determined that the azimuths of the object detected based on the reception signals from the receiving antennas of the receiving antenna array match each other; and determining that the detected azimuth of the object is not correct when it is determined that the azimuths of the object detected based on the reception signals from the receiving antennas of the receiving antenna array do not match each other.

13. A non-transitory computer-readable medium containing an object detection program which causes a computer of an on-board radar apparatus to perform the processes of:

generating a first modulated wave, a second modulated wave, and a third modulated wave which are different from each other;

transmitting a transmission wave based on the first modulated wave, the second modulated wave, and the third modulated wave;

receiving a reception wave arriving by allowing the transmission wave to be reflected by an object; and detecting a signal based on the first modulated wave, the second modulated wave, and the third modulated wave from the reception wave and detecting an azimuth of a first object based on a signal based on the first modulated wave and a signal based on the second modulated wave and detects an azimuth of a second object based on the signal based on the second modulated wave and a signal based on the third modulated wave.

14. The non-transitory computer-readable medium containing the object detection program according to claim 13, wherein the transmission wave includes a signal wave in which the first modulated wave, the second modulated wave, and the third modulated wave are arranged at predetermined time intervals in the order of the first modulated wave, the second modulated wave, and the third modulated wave.

15. The non-transitory computer-readable medium containing the object detection program according to claim 13, wherein a modulation time of the first modulated wave is longer than modulation times of the second and third modulated waves and the modulation time of the second modulated wave is longer than the modulation time of the third modulated wave.

16. The non-transitory computer-readable medium containing the object detection program according to claim 13, wherein the on-board radar apparatus includes a receiving antenna unit including a plurality of receiving antennas that constitutes a receiving antenna array with two or more types of average pitches having no integer multiple relationship;

detecting the azimuth of the object based on reception signals from the receiving antennas of the receiving antenna array;

determining that the detected azimuth of the object is correct when it is determined that the azimuths of the object detected based on the reception signals from the receiving antennas of the receiving antenna array match each other; and determining that the detected azimuth of the object is not correct when it is determined that the azimuths of the object detected based on the reception signals from the receiving antennas of the receiving antenna array do not match each other.

* * * * *